(12) United States Patent
Rasmussen

(10) Patent No.: US 6,330,867 B1
(45) Date of Patent: Dec. 18, 2001

(54) FEEDING DEVICE FOR FEEDING ANIMALS

(75) Inventor: Henrik Rasmussen, Egebjerg (DK)

(73) Assignee: Egebjerg Maskinfabrik A/S, Nykobing Sjaelland (DE)

(*) Notice: Subject to any disclaimer, the term of this patent is extended or adjusted under 35 U.S.C. 154(b) by 0 days.

(21) Appl. No.: 09/402,223

(22) PCT Filed: Apr. 3, 1998

(86) PCT No.: PCT/DK98/00134

§ 371 Date: Nov. 17, 1999

§ 102(e) Date: Nov. 17, 1999

(87) PCT Pub. No.: WO98/44784

PCT Pub. Date: Oct. 15, 1998

(30) Foreign Application Priority Data

Apr. 3, 1997 (DK) .................................................. 0379/97

(51) Int. Cl.[7] .................................................. A01K 61/02
(52) U.S. Cl. .................................................. 119/52.1
(58) Field of Search .................. 119/52.1, 53, 53.5, 119/54

(56) References Cited

U.S. PATENT DOCUMENTS

| | | | | |
|---|---|---|---|---|
| 1,199,655 | * | 9/1916 | Battle | 119/54 |
| 1,269,108 | * | 6/1918 | Nichols | 119/54 |
| 2,525,385 | * | 10/1950 | Uhrenholdt | 119/54 |
| 5,850,805 | * | 12/1998 | Kleinsasser | 119/54 |
| 5,921,200 | * | 7/1999 | Bondarenko et al. | 119/52.1 |

FOREIGN PATENT DOCUMENTS

| | | |
|---|---|---|
| 2506236 | 8/1976 | (DE) . |
| 2652788 | 5/1978 | (DE) . |
| 2653788 | 9/1977 | (DK) . |
| 9400227 | 9/1994 | (DK) . |
| 9400123 | 6/1995 | (DK) . |
| 9400446 | 3/1996 | (DK) . |
| 13652 | 7/1993 | (WO) . |
| 95/24120 | 9/1995 | (WO) . |
| 96/16537 | 6/1996 | (WO) . |

* cited by examiner

*Primary Examiner*—Thomas Price
(74) *Attorney, Agent, or Firm*—Ladas & Parry

(57) ABSTRACT

A feeding device (1) is intended for use for feeding piglets. The feeding device comprises a pivotally pipe (2) mounted on a frame in a position below a hopper (10). A control bar (15) extends through the hopper (10) and the pipe (2) and is fastened to the lower end of the pipe by means of a fitting (25). The control bar (15) is made of an elastically flexible material and may be displaced in a slide bushing (16) in order to adjust the elastic flexibility by adjusting the length of the free section (33) of the bar (15). The pipe (2) may thus be deflected when animals push to the lower end in order to eat fodder on a fodder plate (4). Subsequent to a deflection the pipe will take its neutral starting position. By suitable dimensioning of the bar (15) an elastic flexibility is achieved in an easy and simple way, whereby the feeding device may be adjusted to animals of different sizes and especially to piglets.

9 Claims, 2 Drawing Sheets

FEEDING DEVICE FOR FEEDING ANIMALS

BACKGROUND OF THE INVENTION

The present invention relates to a feeding device for feeding animals, preferably piglets, and which comprises a base designed with a fodder plate, a frame fastened to the base, a mainly stiff pipe suspended pivotally in the frame via suspending means, a funnel-shaped hopper for fodder fixed to the frame and provided with a lower outlet communicating with the upper end of the pipe, a dispensing unit formed by the lower end of the pipe, which pipe may be slided mainly vertically by means of a control bar extending through the interior of the hopper and the pipe, the control bar being fastened to the hopper and to the pipe, where the upper end of the bar is connected with means for elevating and lowering the pipe.

DK Utility Model No. 94 00446 discloses a feeding device of the kind mentioned in the introduction. When an animal is hungry it pushes the lower end of the pipe so that fodder flows out on the fodder plate. The pipe which is a loose sleeve is fastened to the control bar through a connection at the upper end of the sleeve. This sleeve is arranged solely for pendular movement. This do not ensure an accurate dosage of the fodder to animals of different sizes. Since a precise adjustment of the sleeve is difficult dosage of small amounts for piglets will be especially difficult.

In WO 93/13652 a feeding device is described for feeding pigs and which has a distance adjusting mechanism connecting the upper end of the tubular fodder hopper and a stationary structural section. This feeding device functions in such a way that an animal when hungry pushes its snout against the pipe in order to move it so that the fodder flows out from the pipe.

A feeding device of the above-mentioned kind has performed very satisfactorily but some drawbacks have appeared. Thus it has shown to be difficult to provide an elastically flexible pipe with sufficient elasticity for piglets. Therefore it will be difficult to adapt the feeding device optimally according to the force which piglets can act on the pipe with and furthermore, it will be expensive to make such a device because elastically flexible material for making the pipe will be relative expensive. Furthermore, it will become difficult to dispense the fodder in an accurate and simple way using the very flexible pipe.

German Patent No. 26 52 788 discloses another feeding device where a relatively short piece of pipe is connected with a funnel-shaped container. In this construction the flexibility is achieved by means of a funnel-shaped sleeve connecting the fodder hopper with the fodder pipe. In this construction a control of the fodder flow rate is difficult as the whole hopper has to be displaced upwards and downwards on a frame. Furthermore, it will be difficult to control the amount of fodder in a sufficiently simple and accurate way as the resiliency of the pipe will be dependent on the degree of filling and the amount of fodder in the funnel shaped sleeve.

Especially when feeding piglets with fodder having a large content of milk powder or granulated fodder material, e.g. milled corn in which melted fat has been absorbed, a great risk exists that the fodder clutches and congests the pipe or the hopper. No efficient solution to this problem has been indicated in connection with the known constructions.

It is the object of the present invention to provide a feeding device which is simple and cheap to manufacture and which is suitable for feeding piglets, where it is simple and easy to control precisely the discharged amount of fodder so that the device easily may be adjusted to the size of the animals.

This object is achieved with a feeding device of the type mentioned in the introduction and which is peculiar in that the control bar is fastened to the lower end of the pipe, that the control bar is elastically flexible and mounted slidably in one or two tubular slide bushings that are mutually spaced apart and fastened to the hopper. Each slide bushing will preferably be elongated.

In addition to the adjustment of the height of the fodder pipe, the control bar provides a greater or lesser deflection of the pipe at a given action of a force on its lower end. This is advantageously for feeding piglets which do not have so much force to push the pipe than pigs, and therefore they would get a smaller amount of feed.

The feeding device according to the present invention may be said to be an improvement and alternative solution to the problems connected with the known feeding devices according to the two above-mentioned publications.

By making a control bar of an elastically flexible material being placed in said at least one of the bushings, this control bar may simultaneously fulfil two purposes, i.e. an adjustment of the height of the pipe over the fodder plate and thereby an adjustment of the discharged amount of fodder simultaneously with the control bar providing a greater or lesser deflection of the fodder pipe at a given action of a force on the lower end of the pipe.

The control bar thus creates an elastic flexibility of the fodder pipe, which has shown to be advantageous by the feeding of animals. When the animals act with a force in a transverse direction the first movement may occur as a pendular movement due to clearances at the point of fastening the pipe to the control bar. Alternatively the control bar may be firmly connected with the pipe so that any movement occurs as an elastically resilient movement of the pipe and thus the pipe will always be returned to a starting position.

The principle of feeding by means of a flexible pipe is known from the above mentioned publication and will not be described in detail. It shall only be mentioned that the elastic flexibility has to be in such a way that the movement may be established by the animals eating fodder supplied through a gap delimited by the lower edge of the fodder pipe and the fodder plate. At the same time the elastically, flexible movement transversely of the fodder plate will prevent the forming of bridges or congestion of fodder in the pipe or in the hopper. Thus the control bar extending through the pipe and the hopper will contribute to prevent congestion. This is especially important in connection with fodder having a high content of milk powder and/or fat.

As the mainly stiff pipe is suspended freely pivotally on the frame at its upper end in a ring-shaped suspending means, the elastic reversing force for the pipe will be determined solely be the flexibility of the control bar. As it is possible to buy tubular spring steel rods in different dimensions the desired elasticity may be achieved very simply. The pipe may be manufactured of a cheap stiff material.

Controlling the feeding device may take place in an uncomplicated way just by displacing the pipe upwards or downwards by means of the control bar, and when the feeding device has to be adjusted to animals in different sizes it takes place simply by changing the position of the slide bushing in relation to the hopper and thereby in relation to the fodder plate.

By making a suitable setting of the slide bushing relative to the free end of the control bar projecting below the slide bushing it is possible to control the feeding device so it is adjusted to the actual size of the animals fed by the device. The slide bushing may thus be placed in a larger or lesser distance over the fodder plate and may be placed inside the hopper or may extend partly downwards into the pipe.

The dimensions of the control bar may be varied, the length of the slide bushing may be varied, the position of the slide bushing may be varied, as well as the use of two mutually spaced apart slide bushings is possible. This makes it possible to adjust a feeding device according to the present invention to animals having different sizes. Accordingly, the feeding device may also be adjusted for use by other animals than piglets.

Even though the feeding device may be very suitable for use by feeding piglets, which may act on the outlet end of the pipe with a small force, the feeding device may be adapted to feed larger pigs or other animals which are able to act on the outlet end of the pipe with a large force, just by exchanging the control bar.

DESCRIPTION OF THE DRAWING

The present invention will be explained in more detail hereinafter with reference to the accompanying schematic drawing, in which.

EMBODIMENTS

Figure 1:
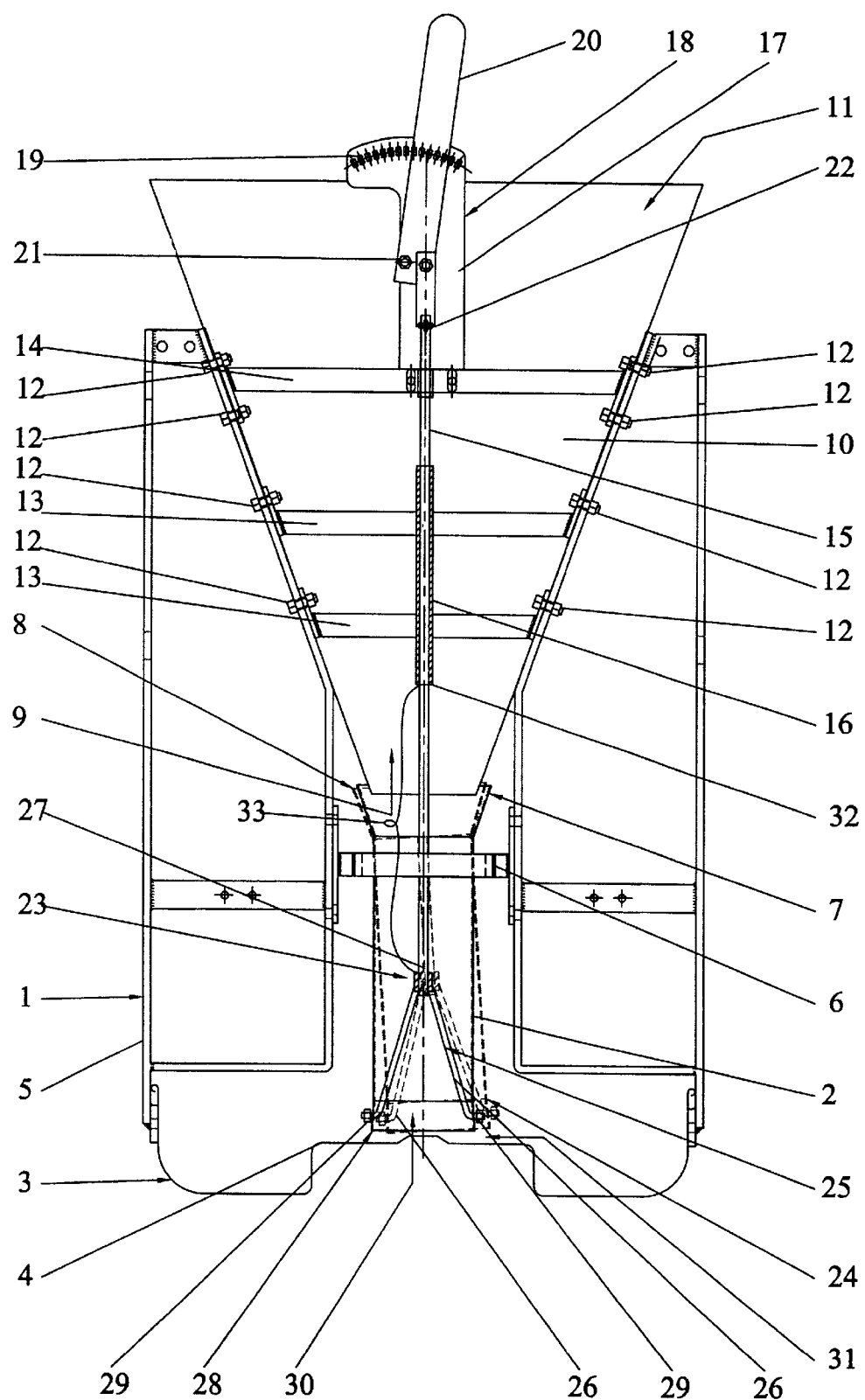
FIG. 1 shows a section through a first embodiment of a feeding device according to the invention.

Identical or corresponding elements in the two figures of the drawing are denoted with the same reference numbers. Such elements will not be explained in detail in connection with each figure.

A feeding device 1 according to the present invention is shown in both figures. The feeding device comprises a pipe 2 immediately above a base 3 designed with an integrated fodder plate 4. The pipe 2 is mounted pivotally on a frame 5 by means of a ring-shaped suspending means 6. The suspending means 6 engages the pipe 2 under a funnel-shaped part 7 at the upper end 8 of the pipe 2. The upper end 8 is bent outwards to form a funnel-shape 7 having a dimension being capable of receiving an outlet 9 of a hopper 10 arranged to contain fodder. The hopper 10 may be filled manually or by means of not shown automatic fodder conveying system having discharge openings at the top 11 of the funnel-shaped fodder hopper 10.

The fodder hopper 10 is firmly fixed to the frame 5 by means of screw connections 12, which also are used for fastening fittings 13,14 inside the hopper 10. The fittings 13,14 serve as support of a control bar 15 mounted in a slide bushing 16 for a vertical displacement. The fitting 14 also serves as a support of a control means 17 for elevating and lowering the control bar 15.

The control means 17 consists of a bracket 18 having a row of arresting apertures 19 to be engaged by projections on a handle 20. The handle 20 is arranged for pivoting about a pivot 21 which is fastened on the bracket 18 and connected with the control bar 15 via a screw connection 22. By pivoting the handle 20 the control bar 15 may be elevated and lowered.

The control bar 15 extends through the hopper 10 and the interior of the pipe 2. At its lower end 23 the control bar 15 is connected with the lower end 24 of the pipe 2 by means of a fitting 25. The fitting 25 is made symmetrically with two diametrically directed branches 26. At their central part these are provided with an aperture 27 for receiving and fastening the bar 15. The branches 26 are fastened to the pipe 2 at their distal ends 28 by means of nuts 29. The fitting 25 is preferably made of round iron bars or iron strips and has a small dimension as seen in the longitudinal direction of the pipe 2. Alternatively, fittings having three or four branches may be used instead of a fitting having two branches. However, it is preferred to use two branches 26 in order to minimise the obstruction of the outlet opening 30 of the pipe.

The control bar 15 is elastically flexible and may deflect from the position shown with full-drawn line to the position shown with punctuated lines when animals eating the fodder flowing out on the fodder plate 4 press the lower end of the 24 of the pipe 2. At the pivoting the gap 31 created between the fodder plate 4 and the lower end 24 of the pipe 2 will be increased. By varying the elasticity there is achieved a possibility of adjusting the dispensed amount of fodder.

The pipe 2 and possible the hopper 10 are preferably made of clear plastic in order to visually considering the filling of the device. Alternatively, the pipe 2 and the hopper 10 may be made of other materials, like steel, as the pipe do not need to be elastically resilient in it self.

In FIG. 1 a tubular slide bushing 16 is seen which is elongated and extend through the hopper. The bushing 16 has a lower end 32 situated immediately above the outlet opening 9 of the hopper. The slide bushing 16 is fastened to the fittings 13 in such a way that it may displaced upwards and downwards and fixed at different levels. Hereby the lower end 32 may be positioned at different distances in relation to the hopper 10, and at the same time the length 33 of the free section of the bar 15 may be adjusted whereby a greater or lesser flexibility is achieved and thereby an adaptation for larger or smaller animals.

Figure 2:
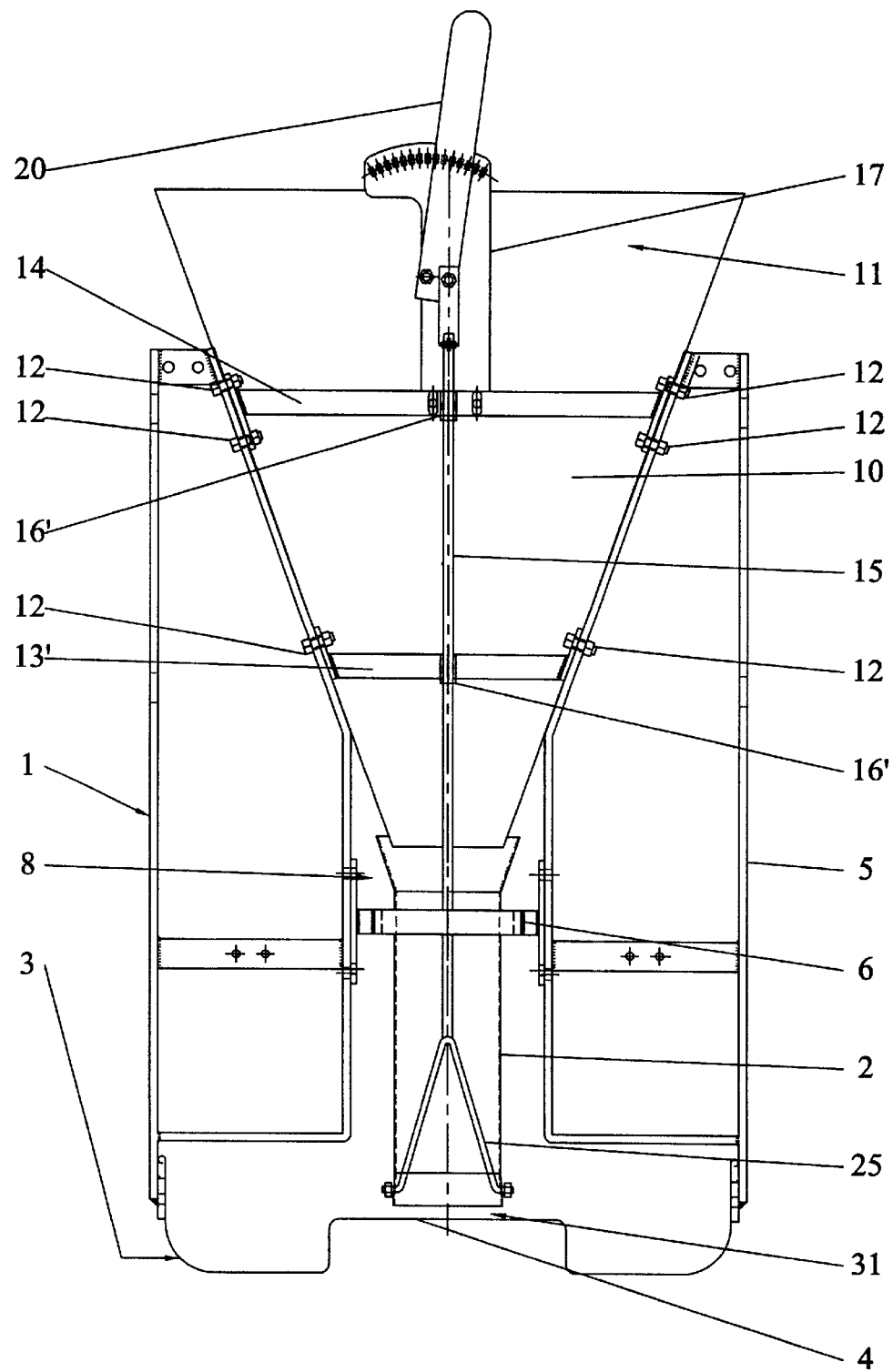
FIG. 2 shows a corresponding section through another embodiment of a feeding device according to the invention.

In FIG. 2 an alternative embodiment is shown in which the slide bushing is provided in the shape of two separate slide bushings 16'. These are placed in a lower fitting 13' and an upper fitting 14, respectively, corresponding to the fittings shown in FIG. 1. In this embodiment it is not possible to adjust the free length 33 of the bar 15. It is possible to adjust the elastic flexibility by exchanging the bar 15 with a corresponding control bar having other dimensions or bending characteristics.

In a specific embodiment the lower part 24 of the pipe 2, that is around the aperture 30, the pipe may be provided with a protective bushing made of steel or a like hard material. This prevents the animals from tearing up the end of the pipe 2 by accidentally biting.

What is claimed is:

1. A feeding device for feeding fodder to animals comprising a base designed with a fodder plate, a frame fastened to the base, a mainly stiff pipe having an upper end and a lower end, the pipe suspended pivotally in the frame by a suspending means, a funnel-shaped hopper for fodder fixed to the frame and provided with a lower outlet connected to the upper end of the pipe, a dispensing unit formed by the lower end of the pipe wherein the pipe may be slid mainly vertically by a control bar extending through the interior of the hopper and the pipe, the control bar having an upper end and a lower end, the control bar being fastened to the hopper and to the pipe, wherein the upper end of the bar is connected with means for elevating and lowering the pipe, wherein the control bar is fastened to the lower end of the pipe, and wherein the control bar is elastically flexible and mounted slidably in a slide bushing and fastened to the hopper.

2. A feeding device according to claim 1 wherein the slide bushing slide upwards and downwards relatively to the hopper with the purpose of increasing or decreasing the length of movable part of the control bar.

3. A feeding device according to claim 1 wherein the bar extends along a center axis of the pipe and where the lower end of the bar is connected to the lower end of the pipe by a means for fastening having a symmetrical fitting, a small dimension as seen in the longitudinal direction of the pipe and a central aperture for receiving the bar, wherein the fitting is provided with a means for fastening to the pipe at its ends.

4. A feeding device according to claim 3 wherein the fitting has two diametrically extending branches, wherein the fitting fastened to the pipe by nuts screwed on ends of the branches.

5. A feeding device according to claim 1 wherein the pipe is made of plastic and its lower end is provided with a protective bushing made of a hard material, the control bar fastened to the pipe via the protective bushing.

6. A feeding device according to claim 1 wherein the slide bushing is fastened to the hopper by a lower fastening fitting mounted close to a lower end of the slide bushing and an upper fastening fitting mounted close to an upper end of the slide bushing, the control bar connected to the hopper by an adjusting device mounted on a fitting at the top of the hopper for adjusting the height of the pipe over the fodder plate.

7. A feeding device according to claim 1 wherein the upper end of the pipe is bent outward to form a funnel shape with a dimension suitable for receiving the outlet of the hopper.

8. A feeding device according to claim 1 wherein the slide bushing is elongated and extends through the hopper to a point immediately above the lower outlet of the hopper.

9. A feeding device according to claim 1 wherein the slide bushing is disposed at the top of the hopper and a second slide bushing is disposed at the bottom of the hopper.

* * * * *